United States Patent
Rector

(10) Patent No.: US 9,450,879 B2
(45) Date of Patent: Sep. 20, 2016

(54) ADAPTIVE BANDWIDTH THROTTLING

(71) Applicant: Fusion-io, Inc., Salt Lake City, UT (US)

(72) Inventor: Richard Rector, Louisville, CO (US)

(73) Assignee: NexGen Storage, Inc., Louisville, CO (US)

( * ) Notice: Subject to any disclaimer, the term of this patent is extended or adjusted under 35 U.S.C. 154(b) by 96 days.

(21) Appl. No.: 14/280,559

(22) Filed: May 16, 2014

(65) Prior Publication Data

US 2015/0326481 A1    Nov. 12, 2015

Related U.S. Application Data

(60) Provisional application No. 61/991,158, filed on May 9, 2014.

(51) Int. Cl.
| | |
|---|---|
| *H04L 12/801* | (2013.01) |
| *H04L 12/853* | (2013.01) |
| *H04L 12/873* | (2013.01) |
| *H04L 12/64* | (2006.01) |

(52) U.S. Cl.
CPC ........... *H04L 47/14* (2013.01); *H04L 12/6418* (2013.01); *H04L 47/2416* (2013.01); *H04L 47/522* (2013.01)

(58) Field of Classification Search
CPC .. H04L 47/14; H04L 47/2416; H04L 47/522
See application file for complete search history.

(56) References Cited

U.S. PATENT DOCUMENTS

| | | | |
|---|---|---|---|
| 5,983,278 A | 11/1999 | Chong et al. | |
| 6,055,577 A | 4/2000 | Lee et al. | |
| 6,125,397 A | 9/2000 | Yoshimura et al. | |
| 6,385,673 B1 | 5/2002 | DeMoney | |
| 6,785,768 B2 | 8/2004 | Peters et al. | |
| 6,850,965 B2 | 2/2005 | Allen | |
| 6,904,596 B1 | 6/2005 | Clark et al. | |
| 7,171,482 B2 | 1/2007 | Jones, Jr. et al. | |
| 7,418,494 B2 | 8/2008 | Dahlin et al. | |
| 7,428,624 B2 | 9/2008 | Fujita et al. | |
| 7,962,709 B2 | 6/2011 | Agrawal | |
| 8,060,643 B2 | 11/2011 | Messick et al. | |
| 8,204,855 B2 | 6/2012 | Salmon et al. | |
| 8,209,430 B2 | 6/2012 | Barreto et al. | |

(Continued)

OTHER PUBLICATIONS

"Congestion Avoidance Overview", Cisco, downloaded Apr. 1, 2014, pp. 6, http://www.cisco.com/c/en/us/td/docs/ios/12_2/qos/configuration/guide/f.

(Continued)

*Primary Examiner* — Brian D Nguyen
(74) *Attorney, Agent, or Firm* — Christopher J. Kulish

(57) ABSTRACT

Apparatuses, systems, methods, and computer program products are disclosed for adaptive bandwidth throttling. A monitor module determines a network bandwidth and/or a historical bandwidth for a data transfer between a storage source and a storage target. A target module adjusts a target bandwidth for a data transfer using a weighting factor. A target bandwidth may be based on at least one of a network bandwidth and a historical bandwidth. A weighting factor for a target bandwidth may be based on a priority for a data transfer. A transfer module transfers at least a block of data of a data transfer from a storage source to a storage target in a manner configured to satisfy a target bandwidth. A delay before transferring a block and/or a block size for the block may be selected based on a target bandwidth.

21 Claims, 7 Drawing Sheets

(56) References Cited

U.S. PATENT DOCUMENTS

| | | |
|---|---|---|
| 8,239,564 B2 | 8/2012 | Freelander et al. |
| 8,356,110 B2 | 1/2013 | Udani et al. |
| 8,370,305 B2 | 2/2013 | Petrocelli |
| 8,510,458 B2 | 8/2013 | Nassor et al. |
| 8,572,038 B2 | 10/2013 | Erofeev |
| 8,578,045 B2 | 11/2013 | Bowra et al. |
| 8,589,347 B2 | 11/2013 | Erofeev |
| 8,614,951 B2 | 12/2013 | Liu et al. |
| 8,661,153 B2 | 2/2014 | Ta et al. |
| 2003/0169688 A1* | 9/2003 | Mott ............... H04L 12/5695 370/230 |
| 2005/0047343 A1* | 3/2005 | Sharony ............ H04L 47/10 370/235 |
| 2006/0168288 A1 | 7/2006 | Covell et al. |
| 2006/0187835 A1* | 8/2006 | Ahn ............... H04L 41/0896 370/230 |
| 2007/0268829 A1* | 11/2007 | Corwin ............. H04L 47/10 370/235 |
| 2008/0294758 A1* | 11/2008 | Xiao ............... H04L 12/5695 709/221 |
| 2012/0150798 A1* | 6/2012 | Dawson ........... G06F 3/0613 707/622 |
| 2013/0089033 A1* | 4/2013 | Kahn ............... H04W 28/22 370/329 |
| 2013/0176848 A1* | 7/2013 | Jinzaki ............ H04L 47/193 370/230.1 |
| 2013/0215767 A1* | 8/2013 | Bryant ............. H04L 43/087 370/252 |

OTHER PUBLICATIONS

"Exponential Backoff", Wikipedia, downloaded Apr. 1, 2014, pp. 3, http://en.wikipedia.org/wiki/Exponential_backoff.

"Navisphere Quality of Service Manager", EMC, Oct. 2006, pp. 13, White Paper.

"TCP Congestion-Avoidance Algorithm", Wikipedia, downloaded Apr. 1, 2014, pp. 6, http://en.wikipedia.org/wiki/TCP_congestion-avoidance_algorithm.

* cited by examiner

ADAPTIVE BANDWIDTH THROTTLING

CROSS-REFERENCES TO RELATED APPLICATIONS

This application claims the benefit of U.S. Provisional Patent Application No. 61/991,158 entitled "ADAPTIVE BANDWIDTH THROTTLING" and filed on May 9, 2014 for Richard Rector, which is incorporated herein by reference.

TECHNICAL FIELD

The present disclosure, in various embodiments, relates to data transfers and more particularly relates to adaptive bandwidth throttling of data transfers based on priority.

BACKGROUND

Various tasks cause data to be transferred or copied over a network. Some tasks are more important than others. For example, it may be more important to service storage requests from user applications than to copy data for a periodic backup or other background task. Even different data transfers for the same type of background task may vary in importance. Backup of mission critical data may be more important than standard business data or non-critical data.

When different data transfers or different types of data are treated similarly, a less important data transfer may take up bandwidth of a more important data transfer. For example, a data transfer for a real-time or user-facing task may be slowed or interrupted by a background data transfer. Slowing or interrupting a data transfer of a real-time or user-facing task may directly impact a user or storage client or a data transfer of non-critical data may impact a data transfer of mission critical data.

SUMMARY

Methods are presented for adaptive bandwidth throttling. In one embodiment, a method includes determining a network bandwidth and/or a historical bandwidth for a data transfer between a storage source and a storage target. A method, in certain embodiments, includes adjusting a target bandwidth for a data transfer using a weighting factor. A target bandwidth may be based on at least one of a network bandwidth and a historical bandwidth. A weighting factor for a target bandwidth may be based on a priority for a data transfer. A method, in one embodiment, may include transferring at least a block of data of a data transfer from a storage source to a storage target in a manner configured to satisfy a target bandwidth. A delay before transferring a block and/or a block size for the block may be selected based on a target bandwidth.

Apparatuses are presented for adaptive bandwidth throttling. In one embodiment, a monitor module is configured to monitor network bandwidths used by a plurality of data transfers of data from different storage volumes. Storage volumes may be associated with different quality of service levels. A target module, in certain embodiments, is configured to determine target bandwidths for data transfers based on monitored network bandwidths and/or different quality of service levels of different storage volumes. In a further embodiment, a bandwidth module is configured to determine one or more of a delay and a block size for data transfers based on target bandwidths.

An apparatus, in another embodiment, includes means for tracking a historical bandwidth and/or a recent bandwidth for a data transfer. In one embodiment, an apparatus includes means for adjusting a delay and/or a block size for a data transfer based on a historical bandwidth, a recent bandwidth, a priority for the data transfer, or the like. An apparatus, in a further embodiment, includes means for transferring one or more segments of a data transfer with an adjusted delay and/or an adjusted block size for the one or more segments of the data transfer.

Computer program products comprising a computer readable storage medium are presented. In certain embodiments, a computer readable storage medium stores computer usable program code executable to perform operations for adaptive bandwidth throttling. In one embodiment, an operation includes determining a block size for a background transfer between a source device and a target device. An operation, in a further embodiment, includes transferring a block of data for a background transfer between a source device and a target device at a block size. In certain embodiments, an operation includes determining a recent bandwidth for a transfer of a block of data. An operation, in one embodiment, includes determining a historical bandwidth for a transfer of a plurality of blocks of data. In a further embodiment, an operation includes determining a bandwidth limit between a source device and a target device.

An operation, in one embodiment, includes updating a bandwidth rate for transfer of a subsequent block of data for a background transfer based on at least one of a recent bandwidth and a historical bandwidth. A weighting factor for a bandwidth rate may be based on a priority for a background transfer. In certain embodiments, an operation includes determining one or more of a delay and an updated block size for a subsequent block of data for a background transfer to satisfy an updated bandwidth rate and/or a bandwidth limit. An operation, in one embodiment, includes transferring a subsequent block of data using a determined one or more of a delay and an updated block size.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
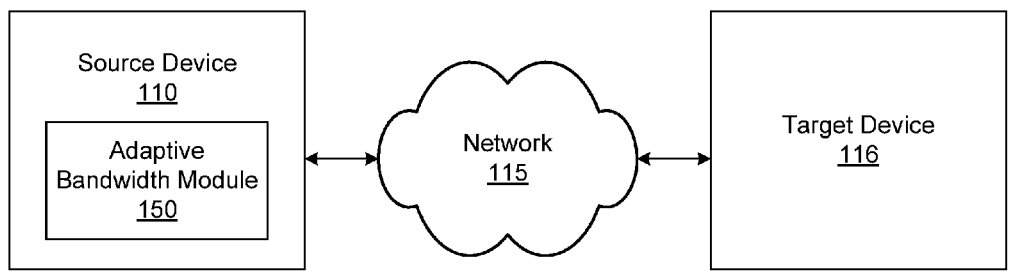
FIG. 1A is a schematic block diagram of one embodiment of a system for adaptive bandwidth throttling.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A depicts one embodiment of a system 100 for adaptive bandwidth throttling of data transfers. In the depicted embodiment, the system 100 includes a source device 110 in communication with a target device 116 over a data network 115. The source device 110 includes an adaptive bandwidth module 150.

The adaptive bandwidth module 150 may be part of and/or in communication with one or more of a computing device or other source device 110, a non-volatile memory controller, a non-volatile memory media controller, a storage appliance, a device driver or storage management layer (SML), a software application or storage client for a data transfer, or the like, as described in greater detail below with regard to FIG. 1B. The adaptive bandwidth module 150 may operate on or in cooperation with a non-volatile memory system of a source computing device 110, which may comprise a processor, a volatile memory, a communications interface, or the like as described below.

In one embodiment, the source device 110 and/or the target device 116 may comprise a computing device such as a server, a desktop computer, a laptop, a tablet, a mobile telephone device, a video game system, a set-top box, or the like. In a further embodiment, the source device 110 and/or the target device 116 may comprise network hardware of the data network 115, such as a router, a switch, a modem, a storage appliance (e.g., of a storage area network (SAN)), a server, or the like.

The target device 116 may comprise a storage device, a computing device, a storage appliance, a storage client executing on a device, or the like in communication with the source device 110 over the data network 115. The target device 116 may comprise a non-volatile memory device, a volatile memory, or the like for receiving data of a data transfer from the source device 110. The data communication network 115 may comprise an Internet Protocol network, a Storage Area Network, a storage fabric, a local area network (LAN), a wide area network (WAN), a wireless network, a wired network, the internet, or the like.

The source device 110 may further comprise a non-transitory, computer readable storage media. The computer readable storage media may comprise executable instructions configured to cause the source device to perform steps of one or more of the methods disclosed herein. Alternatively, or in addition, the adaptive bandwidth module 150 may be embodied as one or more computer readable and/or executable instructions stored on the non-transitory storage media of the source device 110, logic hardware of the source device 110, or the like.

The adaptive bandwidth module 150, in one embodiment, is configured to manage one or more data transfers from a storage source such as the source device 110 to one or more storage targets such as the target device 116. A storage source, as used herein, comprises a logical or physical data repository from which data may be copied or transferred. A storage target, as used herein, comprises a logical or physical data repository for receiving transferred data. A storage source and a storage target may comprise volatile memory or storage, non-volatile memory or storage, or the like. A storage source may comprise a source device 110, memory or storage of a source device 110, remote memory or storage, or the like. A storage target may comprise a target device 116, memory or storage of a target device 116, remote memory or storage, or the like. The adaptive bandwidth module 150 may artificially or dynamically throttle or otherwise adjust a bandwidth used by a data transfer to minimize an impact of the data transfer on other data communications over the data network 115. For example, in certain embodiments, the adaptive bandwidth module 150 may limit or throttle one or more background data transfers to minimize or reduce an impact of the one or more background data transfers on other data operations.

The adaptive bandwidth module 150 may adjust a bandwidth used by a data transfer based on a priority for the data transfer (e.g., a quality of service level or the like). For example, the adaptive bandwidth module 150 may manage or adjust bandwidths for data transfers based on a priority or quality of service level for storage volume and/or storage volume from which the data is being transferred.

In certain embodiments, by proactively throttling or controlling bandwidth for a data transfer on the front-end (e.g., at the source device 110) before the data enters the data network 115, the adaptive bandwidth module 150 may reduce or prevent congestion, dropped packets, or the like that on the data network 115. Without the adaptive bandwidth module 150 managing data transfers, by default, a data transfer may use a maximum available bandwidth, using "best efforts" to transfer the data as fast as possible, even if the data transfer slows or has another negative impact on other data transfers using the network 115.

Instead of simply allowing data transfers with higher priorities/quality of service levels to consume more bandwidth than those with lower, in certain embodiments the adaptive bandwidth module 150 may determine target bandwidths for different data transfers based on a network bandwidth (e.g., a recent bandwidth, a current bandwidth, or the like) for the network 115 and/or a historical bandwidth for the network 115. For example, the adaptive bandwidth module 150 may weight a target bandwidth more toward a historical bandwidth for data transfers of higher priorities and more toward a network bandwidth (e.g., a recent bandwidth) for data transfers of lower priorities. The adaptive bandwidth module 150 may implement or enforce a determined target bandwidth using pulse width modulation for the data transfer by determining a delay and/or a block size for the data transfer based on the determined target bandwidth, adjusting or changing a delay and/or block size dynamically during transmission within the same data transfer, or the like.

In certain embodiments, by weighting, shifting, and/or biasing data transfers with higher priorities more toward a historical bandwidth, the data transfers with higher priorities may consume a more consistent and/or constant bandwidth, while data transfers with lower priorities may be more sensitive to the current or more recent bandwidth of the network 115. In such an embodiment, in contrast to a system that simply provides tiered allocations of bandwidth based on priority or quality of service, when a network bandwidth (e.g., a recent bandwidth) is higher than an average bandwidth, a historical bandwidth, or the like, the adaptive bandwidth module 150 may allow a lower priority data transfer to consume more bandwidth than a higher priority, at least temporarily, because the higher priority data transfer is weighted or shifted more toward the average or historical bandwidth. While this result may seem counterintuitive, it allows the higher priority data transfer to consume a more consistent amount of bandwidth and allows the lower priority data transfer to use excess available bandwidth. The adaptive bandwidth module 150 is described in greater detail below.

In one embodiment, the adaptive bandwidth module 150 may comprise executable software code, such as a device driver, a SML, or the like, stored on a computer readable storage media for execution by a processor. In another embodiment the adaptive bandwidth module 150 may comprise logic hardware of the source device 110, of one or more non-volatile memory devices such as a non-volatile memory media controller, a non-volatile memory controller, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the adaptive bandwidth module 150 may include a combination of both executable software code and logic hardware.

Figure 1B:
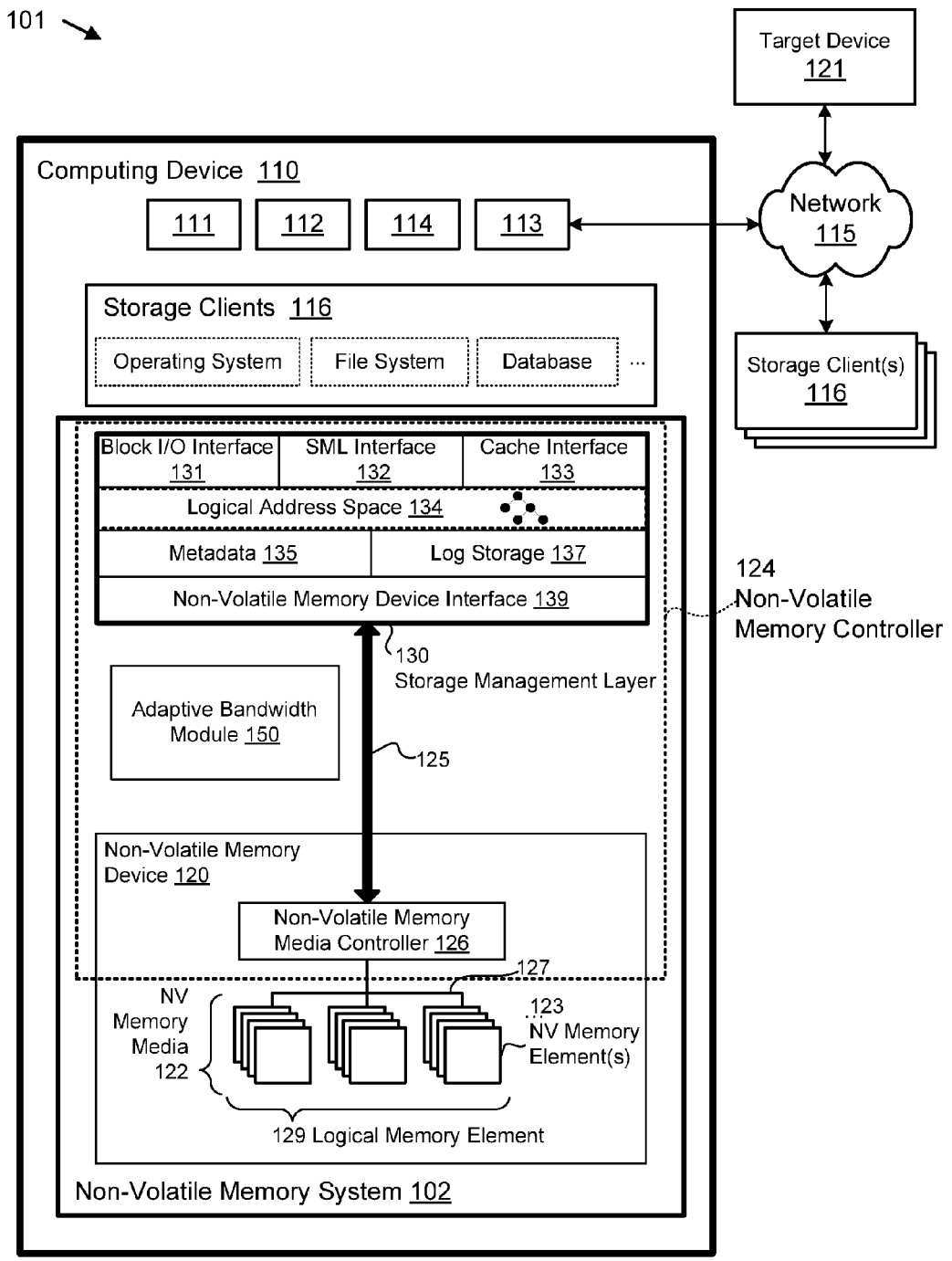
FIG. 1B is a schematic block diagram of another embodiment of a system for adaptive bandwidth throttling.

FIG. 1B depicts another embodiment of a system 101 comprising an adaptive bandwidth module 150. The adaptive bandwidth module 150 may be part of and/or in communication with one or more of a storage processor of a SAN storage appliance, a non-volatile memory controller 124, a non-volatile memory media controller 126, a device driver or storage management layer (SML) 130, or the like. The adaptive bandwidth module 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more storage processors of a storage appliance, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network (SAN), a storage fabric, a local area network (LAN), a wide area network (WAN), a wireless network, a wired network, the internet, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the adaptive bandwidth module 150 may be embodied as one or more computer readable instructions stored on the non-transitory storage media 114.

In one embodiment, the adaptive bandwidth module 150 may comprise executable software code, such as a device driver, SML 130, or the like, stored on the computer readable storage media 114 for execution on the processor 111. In another embodiment the adaptive bandwidth module 150 may comprise logic hardware of the computing device 110 and/or of one or more non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), a storage processor, or the like. In a further embodiment, the adaptive bandwidth module 150 may include a combination of both executable software code and logic hardware.

In one embodiment, the adaptive bandwidth module 150 is configured to receive storage requests from the SML 130 via a bus 125 or the like. The adaptive bandwidth module 150 may be further configured to transfer data to/from the SML 130 and/or storage clients 116 via the bus 125. Accordingly, the adaptive bandwidth module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the adaptive bandwidth module 150 may receive storage requests as an application programming interface (API) call from a storage client 116, as an IO-CTL command, or the like. The adaptive bandwidth module 150 is described in greater detail below with regard to FIGS. 2 and 3.

According to various embodiments, a non-volatile memory controller 124 comprising the adaptive bandwidth module 150 may manage one or more non-volatile memory devices 120. The non-volatile memory device(s) 120 may comprise recording, memory, and/or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise an SML 130, which may present a logical address space 134 to one or more storage clients 116. One example of an SML is the Virtual Storage Layer® of Fusion-io, Inc. of Salt Lake City, Utah. Alternatively, each non-volatile memory device 120 may comprise a non-volatile memory media controller 126, which may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space 134 to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

In some embodiments, the non-volatile memory controller 124 may be configured to store data on one or more asymmetric, write-once media 122, such as solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The memory media 122 may be partitioned into memory divisions that can be erased as a group (e.g., erase blocks) in order to, inter alia, account for the asymmetric properties of the media 122 or the like. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

The non-volatile memory controller 124 may be further configured to store data in a log format. As described above, a log format refers to a data format that defines an ordered sequence of storage operations performed on a non-volatile memory media 122. In some embodiments, the log format comprises storing data in a predetermined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data. In some embodiments the log format may comprise storing data in an "append only" paradigm. The non-volatile memory controller 124, using the log storage module 137 described below or the like, may maintain a current append point at a media address of the non-volatile memory device 120. The append point may be a current memory division and/or offset within a memory division. Data may then be sequentially appended from the append point.

The storage management layer 130 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120. The one or more non-volatile memory devices 120 may include different types of non-volatile memory devices including, but not limited to: solid-state storage devices, hard drives, SAN storage resources, or the like. The one or more non-volatile memory devices 120 may comprise one or more respective non-volatile memory media controllers 126 and non-volatile memory media 122. As illustrated in FIG. 1B, The SML 130 may provide access to the one or more non-volatile memory devices 120 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface 133, or other, related interfaces.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces.

The SML 130 may further comprise a non-volatile memory device interface 139 configured to transfer data, commands, and/or queries to the one or more non-volatile memory devices 120 over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 124 to a network 115 and/or to one or more remote, network-accessible storage clients 116. The storage clients 116 may include local storage clients 116 operating on the computing device 110 and/or remote, storage clients 116 accessible via the network 115 and/or the network interface 113. While FIG. 1B depicts storage clients 116 executing on the host device 110, in other embodiments, the host device 110 may comprise a SAN storage appliance, or the like, providing external storage clients 116 access to one or more non-volatile memory devices 120 within the SAN storage appliance over the network 115. The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on and/or read data from the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (e.g., a page of each element of non-volatile memory media 122).

Figure 2:
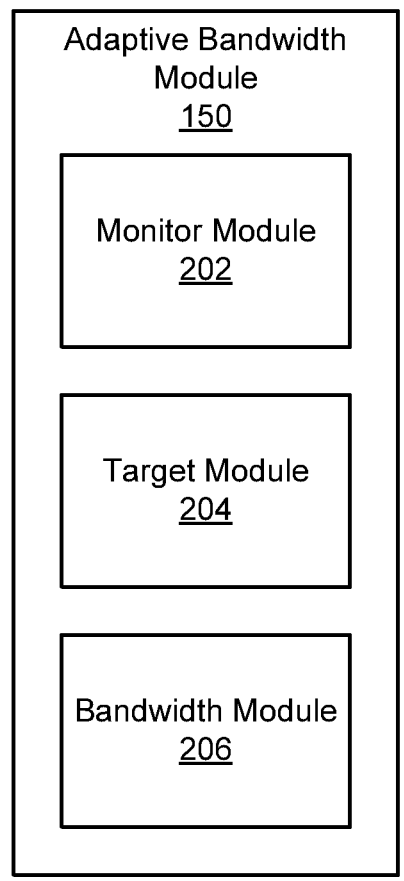
FIG. 2 is a schematic block diagram illustrating one embodiment of an adaptive bandwidth module.

FIG. 2 depicts one embodiment of an adaptive bandwidth module 150. The adaptive bandwidth module 150 may be substantially similar to the adaptive bandwidth module 150 described above with regard to FIGS. 1A and 1B. In general, as described above, the adaptive bandwidth module 150 manages, throttles, adjusts, or otherwise controls one or more data transfers. In the depicted embodiment, the adaptive bandwidth module 150 includes a monitor module 202, a target module 204, and a bandwidth module 206.

In one embodiment, the monitor module 202 is configured to monitor one or more bandwidths for one or more data transfers between a source (e.g., a source device 110) and one or more targets (e.g., one or more target devices 116). As used herein, a data transfer comprises copying or moving data from one location to another location over a network 115, a bus 125, 127, or another communications channel. A data transfer, in certain embodiments, may comprise a background data transfer such as an asynchronous replication process, a deduplication process, or the like. An asynchronous replication process may be considered complete when the local and/or source device 110 acknowledges storage of the data, while a snapshot, backup, or other copy of the data may later (e.g., asynchronously) be copied or transferred to a remote location such as the target device 116, after the data has already been acknowledged by the source device 110 or the like. A background data transfer, in various embodiments, may not be user-facing, may not be monitored or detected by a user in real-time, may not be time sensitive, may be lazily performed, or the like. A data transfer, in a further embodiment, may comprise one or more foreground data transfers, such as one or more user-initiated data transfers, one or more synchronous data transfers, one or more real-time data transfers, or the like.

As used herein, a bandwidth comprises a speed, rate (e.g., a bit rate), and/or throughput of one or more data transfers. A bandwidth may be measured or represented as data transferred or copied over time, such as bits per second, kilobits or kibibits per second, megabits or mebibits per second, gigabits or gibibits per second, or the like. The monitor module 202, in one embodiment, may monitor bandwidths for individual data transfers from the source device 110. In a further embodiment, the monitor module 202 may monitor a total or cumulative bandwidth for multiple data transfers from the source device 110, for a communications interface 113, or the like.

As described in greater detail below with regard to the recent module 310 and the historical module 312 of FIG. 3, the monitor module 202, in certain embodiments, may monitor and/or determine bandwidths for different resolutions or time periods, such as a current and/or recent network bandwidth, a historical network bandwidth, or the like. As used herein, a current and/or recent network bandwidth may include or be based on a shorter and/or more recent period of time than a historical bandwidth. For example, a current and/or recent network bandwidth may comprise a bandwidth or throughput of a transfer of one or more most recent blocks of data for one or more data transfers and a historical bandwidth may comprise a bandwidth or throughput of the one or more entire in-progress data transfers, up to a current point, a longer or larger portion of the one or more data transfers than the network bandwidth, or the like. In certain embodiments, the monitor module 202 defines or tracks bandwidths by time periods, with a current and/or recent network bandwidth having a shorter time period than a historical bandwidth. For example, a time period or window for a current and/or recent network bandwidth may be five minutes and a time period or window for a historical bandwidth may be fifteen minutes, or the like.

The monitor module 202, in one embodiment, may monitor or determine a bandwidth itself, directly. For example, the monitor module 202 may start a timer when a block or segment of data for a data transfer is transferred to time the transfer and may divide the block size of the block or segment of data by the resulting time to determine a bandwidth. The monitor module 202 may time just the transfer of data, may time a delay and the transfer of data, or the like. The monitor module 202 may monitor or determine bandwidths for multiple concurrent data transfers, from different storage volumes, with different priorities or quality of service levels, or the like.

A storage volume, as used herein, may comprise a logical or physical unit or container of data, such as a non-volatile memory device 120, a logical or physical partition or drive, a file system, an array of non-volatile memory devices 120, or the like. A data transfer may be associated with a priority such as a quality of service level or the like. For example, a storage volume from which data is being transferred may have been assigned a priority or quality of service level; a process, job, or task executing a data transfer may have been assigned a priority or quality of service level; or the like.

As used herein, a priority or quality of service level comprises a relative importance of, or desired service level for operations, functions, or features involving the data, a device, network services, or the like. A priority or quality of service level, in various embodiments, may comprise a label or indicator of a differentiated and/or tiered performance (e.g., bandwidth, throughput, delay, availability, error rate, or the like) required or requested for data; for a set of logical identifiers (e.g., a range of LBAs), for a storage volume; for a process, job, or task; for a data network 115; for a user or storage client 116; or the like. For example, in one embodiment, priorities or quality of service levels may include three different tiers or levels, such as mission critical, business critical, and non-critical; low, medium, high; good, better, best; red, yellow, and green; or the like. In other embodiments, priorities or quality of service levels may include two different levels, four different levels, five different levels, or more.

A priority or quality of service level may be directly or indirectly associated with data, with a data transfer, or the like. For example, a data transfer may be assigned a priority or quality of service level directly or may indirectly inherit or otherwise be associated with a priority or quality of service level for data of the data transfer, for a storage volume of the data of the data transfer, for an owner or user of the data, or the like. Similarly, data of a data transfer may be assigned a priority or quality of service level directly (e.g., a QoS level for an LBA range, for a data file, or the like) or may indirectly inherit or otherwise be associated with a priority or quality of service level for a storage volume of the data, for an owner or user of the data, or the like.

The monitor module 202, in certain embodiments, is configured to monitor bandwidths used by a plurality of concurrent data transfers with different priorities or quality of service levels, such as data from different storage volumes or the like. The monitor module 202, as described in greater detail below with regard to the recent module 310 and the historical module 312, may monitor, check, or otherwise determine a network bandwidth, a recent bandwidth, and/or a historical bandwidth for each of a plurality of concurrent data transfers, with different priorities or quality of service levels, or the like.

For example, as described above, the monitor module 202 may start a different timer for each data transfer and may time transfers of blocks or segments for each data transfer and determine a bandwidth based on sizes for the blocks and the transmission times from the timers. The monitor module 202 may combine or average several blocks of network bandwidths and/or recent bandwidths to determine a historical bandwidth, or may otherwise determine a historical bandwidth based on a network bandwidth and/or recent bandwidth. In this manner, a historical bandwidth may include a transfer of a plurality of blocks or segments of data for a data transfer and a network bandwidth and/or a recent bandwidth may include a transfer of a most recently transferred block or segment of data for the data transfer. By monitoring a bandwidth for each of a plurality of data transfers, in certain embodiments, the monitor module 202 allows the adaptive bandwidth module 150 to determine different target bandwidths for the different data transfers, based on different windows or time periods, based on different priorities or qualities of service, or the like.

In one embodiment, the target module 204 is configured to determine a target bandwidth for a data transfer based on one or more monitored bandwidths from the monitor module 202 (e.g., a network bandwidth, a recent bandwidth, and/or a historical bandwidth), based on a priority or quality of service level for the data transfer (e.g., for the data transfer itself, for data of the data transfer, for a storage volume from which the data is being transferred, for a user associated with the data transfer), or the like. The target module 204, in certain embodiments, may be configured to determine multiple different target bandwidths for concurrent data transfers with different priority or quality of service levels.

As described above, a bandwidth may comprise a speed, rate (e.g., a bit rate), and/or throughput of one or more data transfers and may be represented as bits per second, kilobits or kibibits per second, megabits or mebibits per second, gigabits or gibibits per second, or the like. A target bandwidth, as used herein, may comprise a desired and/or recommended bandwidth for a data transfer. A target bandwidth, in certain embodiments, is a bandwidth assignment or bandwidth recommendation which is attempted or targeted, but not strictly enforced. In another embodiment, the target module 204 may be configured to enforce a target bandwidth, ensuring that an actual bandwidth does not exceed a target bandwidth, does not exceed a target bandwidth by more than a predefined amount, or the like.

The target module 204, in one embodiment, is configured to determine target bandwidths using different weighting factors for different priorities or quality of service levels. As used herein, a weighting factor comprises an engineered or predefined value or set of values configured to weight or scale one or more operands for a determination, such as a determination of a target bandwidth. In various embodiments, a weighting factor may comprise a scalar, a coefficient, a variable, a constant, and/or another value usable by the target module 204 to determine a target bandwidth. A weighting factor, in one embodiment, may be selected so that target bandwidths for different priorities or quality of service levels are weighted to, or otherwise associated with, different time periods or windows of bandwidths monitored by the monitor module 202 (e.g., weighted toward a network bandwidth, weighted toward a recent bandwidth, weighted toward a historical bandwidth, or the like). In embodiments where the target module 204 uses different weighting factors for different data transfers, with different priorities or quality of service levels or the like, the different data transfers may have different sensitivities to different portions or periods of bandwidth (e.g., the weighting factor may comprise a sensitivity of the target bandwidth to the recent and/or network bandwidth).

A sensitivity of a target bandwidth to a monitored bandwidth or portion thereof may comprise a response of the target bandwidth to changes in the monitored bandwidth, an amount or portion of the monitored bandwidth on which the target bandwidth is based, or the like. A sensitivity of a target bandwidth to a monitored bandwidth may also be referred to as an affinity, inclination, predilection, preference, propensity, susceptibility, proclivity, and/or tendency of the target bandwidth with regard to a monitored bandwidth. A target bandwidth may be weighted toward a monitored bandwidth (e.g., a network bandwidth, a recent bandwidth, a historical bandwidth) if a weighting factor, scalar, coefficient, or the like for the monitored bandwidth is greater than a weighting factor, scalar, coefficient, or the like for one or more other bandwidths. A weighting factor may comprise a sensitivity of a target bandwidth to a monitored bandwidth. For example, in one embodiment, a weighting factor may comprise a sensitivity of a target bandwidth to a network bandwidth (e.g., a recent bandwidth). The target module 204, in certain embodiments, uses weighting factors selected so that a sensitivity of a target bandwidth, in certain embodiments, increases as a priority or quality of service level for a data transfer decreases. In other embodiments, the target module 204 may use weighting factors selected so that a target bandwidth may have one or more other sensitivities to a monitored bandwidth, based on priority or quality of service levels, or the like.

The target module 204, in one embodiment, may cooperate with the monitor module 202 to update or adjust a target bandwidth for a data transfer over time, during the course of the data transfer, based on one or more monitored or tracked bandwidths. For example, the target module 204 may re-determine or re-adjust a target bandwidth for a data transfer after each block or segment of data is transferred, in response to a predetermined amount of data being transferred, in response to a predetermined amount of time passing, in response to the monitor module 202 determining one or more updated bandwidths, or in response to another trigger. By re-determining, re-adjusting, and/or updating target bandwidths periodically (e.g., for each subsequent block or segment of data), the target module 204 may allow different data transfers to respond differently to changes in available bandwidth, based on priorities or quality of service levels for the different data transfers.

The target module 204, in certain embodiments, is configured to adjust a target bandwidth for a data transfer based on a monitored or tracked network bandwidth, recent bandwidth, and/or historical bandwidth from the monitor module 202, using a weighting factor for the target bandwidth based on a priority for the data transfer, or the like. The target module 204 may use a weighting factor that is selected so that a target bandwidth is based more on one bandwidth or bandwidth period than another, for certain priorities or quality of service levels. For example, a weighting factor may be selected so that a target bandwidth is based more on a historical bandwidth than a network/recent bandwidth for higher values of priority or quality of service levels and is based more on the network/recent bandwidth for lower values of priority or quality of service levels. In this manner, more important or higher priority data transfers may have a more consistent target bandwidth, and the target bandwidth may change less based on recent or temporary changes in network bandwidth than less important or lower priority data transfers.

In one embodiment, the target module 204 determines a target bandwidth comprising a network bandwidth (e.g., a recent bandwidth) multiplied by a weighting factor plus a result of a historical bandwidth multiplied by one minus a weighting factor. In such an embodiment, a weighting factor may be higher for higher priority or quality of service values than for lower values. For example, the target module 204 may use Equation 1 below, or the like, for determining a target bandwidth:

$$Tb=p*Sb+(1-p)*Hb \quad \text{(Equation 1)}$$

In Equation 1, Tb is the target bandwidth, p is the weighting factor, Sb is the short term, network, and/or recent bandwidth, and Hb is the historical bandwidth. In Equation 1, if the weighting factor p is lower for data transfers with higher priority or quality of service levels and higher for data transfers with lower levels, the higher priority data transfers may have a more constant target bandwidth Tb and a lower sensitivity to the short term, network, and/or recent bandwidth Sb while the lower priority data transfers may have a higher sensitivity to the short term, network, and/or recent bandwidth Sb.

In another embodiment, the weighting factor p may be higher for data transfers with higher priority or quality of service levels and lower for data transfers with lower levels. For example, in one embodiment, the target module 204 may determine a target bandwidth comprising a historical bandwidth multiplied by a weighting factor plus a result of a network bandwidth (e.g., a recent bandwidth) multiplied by one minus the weighting factor. In such an embodiment, the target module 204 may use a higher weighting factor p for higher priority data transfers and a lower weighting factor p for lower priority data transfers, using Equation 2, or the like:

$$Tb=(1-p)*Sb+p*Hb \quad \text{(Equation 2)}$$

In certain embodiments, values for the weighting factor p may range between about zero and one, in Equations 1, in Equation 2, or otherwise. For example, in one embodiment, in Equation 1 or the like, the weighting factor p may be zero, closer to zero, or the like for data transfers with higher priorities or quality of service levels, may be one, closer to one, or the like for data transfers with lower priorities or quality of service levels, of the like. In a further embodiment, in Equation 2 or the like, the weighting factor p may be one, closer to one, or the like for data transfers with higher priorities or quality of service levels, may be zero, closer to zero, or the like for data transfers with lower priorities or quality of service levels, of the like. In other embodiment, the weighting factor p may comprise a percentage value, an integer value, a floating point value, or the like, may range between about 0 and 1, between about −1 and 0, between about −1 and 1, between about 1 and 100, between about −100 and 100, between about 0 and 1000, or another range which may weight or shift higher priority or quality of service levels toward a historical bandwidth, may weight or shift lower priority or quality of service levels toward a network bandwidth or recent bandwidth, or may otherwise comprise or influence a sensitivity of a target bandwidth to one or more monitored bandwidths.

In one embodiment, the bandwidth module 206 is configured to adjust a bandwidth for one or more data transfers based on a target bandwidth from the target module 204 (e.g., to satisfy the target bandwidth, to approach the target bandwidth, to move toward the target bandwidth, or the like). For example, in certain embodiments, the bandwidth module 206 may determine a delay for a data transfer, a block size for a data transfer, both a delay and a block size for a data transfer, or the like, based on a target bandwidth for the data transfer. As used herein, a delay for a data transfer comprises a waiting period, hold period, or the like between transfers of different blocks or segments of data for the data transfer, during which little or no data of the data transfer is transferred. For example, the transfer module 302 described below may transfer a first block of data for a data transfer, wait a delay period determined by the bandwidth module 206, and transfer a second block of data for the data transfer. A delay may be measured and/or determined in terms of minutes, seconds, milliseconds, microseconds, nanoseconds, processor cycles, or the like.

A block of data for a data transfer, as used herein, comprises a chunk, an amount, a segment, a section, and/or a portion of data of a data transfer that is transferred contiguously, sequentially, without interruption, between delays, or the like, at least from the perspective of the source device 110. A block or segment of data may comprise a range of addresses (e.g., a range of LBAs, a range of physical addresses), a set of non-contiguous addresses (e.g., LBAs, physical addresses), a file, a subset or portion of a file, and/or another set of data. A block size, as used herein, comprises a data size of a block of data (e.g., a chunk, amount, segment, section, and/or portion of data). A block size, in certain embodiments, is dynamically adjustable, changeable, and/or updatable by the bandwidth module 206. For example, the transfer module 302 may transfer a first block of data having a block size determined by the bandwidth module 206, wait a delay period, and transfer a second block of data having a different block size determined by the bandwidth module 206, both for the same data transfer. The monitor module 202 may dynamically monitor or otherwise determine bandwidths during a data transfer, the target module 204 may dynamically update a target bandwidth based on changes in the monitored bandwidths, and the bandwidth module 206 may dynamically update a delay and/or a block size based on the updated target bandwidth, each during the same data transfer. The bandwidth module 206 may provide a delay and/or a block size to the transfer module 302, described below.

In one embodiment, the bandwidth module 206 may determine a delay time but use a constant and/or predefined block size. In a further embodiment, the bandwidth module 206 may determine a block size but use a constant and/or predefined delay time. In certain embodiments, the bandwidth module 206 may determine both a block size and a delay time for transfer of a block of data for a data transfer. By adjusting, updating, and/or otherwise determining one or more of a delay and a block size for a data transfer, the bandwidth module 206 may adjust a bandwidth for the data transfer to approach or move toward a target bandwidth, based on a target bandwidth, or the like.

For example, in one embodiment, the bandwidth module 206 may determine a block size and/or a delay so that the block size divided by the result of the delay plus an estimated duration of transferring the associated block of data is less than or equal to the target bandwidth. The bandwidth module 206 may estimate a duration of transferring a block of data based on a duration of transferring a previous block of data, based on a throughput measurement or estimate for the data network 115, based on a bandwidth monitored by the monitor module 202, or the like. In this manner, the average bandwidth consumed by a data transfer over the period including a delay and a transfer of a block of data by approximate, approach, or be at least partially based on a target bandwidth for the data transfer.

The bandwidth module 206, in one embodiment, may determine block sizes and/or delays for multiple concurrent data transfers, based on target bandwidths from the target module 204, which the target module 204 may determine based on different priorities or quality of service levels for the different data transfers. By adjusting and/or setting bandwidths (e.g., by setting a delay and/or a block size) for one or more data transfers, such as background data transfers, the bandwidth module 206 may ensure that one or more other data transfers, such as user data transfers, encounter little or no negative effects or slowdowns from the data transfers.

In one embodiment, the bandwidth module 206 determines a delay time and/or a block size based on one or more rules. One rule may define an initial block size, an initial delay, or the like. The bandwidth module 206, in certain embodiments, may set an initial block size for a data transfer to a predetermined initial block size. The predetermined initial block size may be set by a vendor or manufacturer (e.g., a default block size), may be based on a block size determined for a previous data transfer, may be set by a user, or the like. In a further embodiment, the bandwidth module 206 may set an initial delay for a data block of a data transfer to a predetermined initial delay time, which may be set by a vendor or manufacturer (e.g., a default delay time, may be based on a delay determined for a previous data transfer, may be set by a user, or the like. In one embodiment, the bandwidth module 206 sets an initial delay to zero, so that there is no added, artificial delay for transmission of an initial data block of a data transfer. In another embodiment, the bandwidth module 206 may determine an initial block size and/or delay for an initial block of data of a data transfer, based on a previous data transfer, a most recent data transfer, a most recently transferred block of data for a different data transfer, or the like.

In one embodiment, a rule for the bandwidth module 206 that configures the bandwidth module 206 to decrease a block size for a data transfer (e.g., for a subsequent block of data) in response to the bandwidth module 206 determining that a delay for the data transfer was greater than a duration of transferring a block of data for the data transfer at a previous block size (e.g., transferring a previous block of data). For example, if the transfer module 302 spends more time waiting or delaying transfer of a block of data than transferring the block of data, the bandwidth module 206 may reduce the block size, so that the transfer module 302 may transfer smaller data blocks more frequently for subsequent blocks of data. Transferring smaller data blocks more frequently may reduce an impact on the data network 115, provide a more consistent impact on the data network 115, or the like, when compared to transferring larger data blocks less frequently.

In a further embodiment, a rule for the bandwidth module 206 defines a minimum block size, such as 4 KiB, or the like, and the bandwidth module 206 may be configured to honor the minimum block size and not to reduce the block size below the minimum block size. A vendor, a manufacturer, a user, an administrator, or the like may set the minimum block size to a level, for example, where further reduction may have a negative effect, due to the overhead of transferring metadata (e.g., packet headers or the like) with the data or the like.

The bandwidth module 206, in certain embodiments, in response to one of a delay and a block size being determined by a rule, by a default, or the like, may determine, adjust, and/or update the other of the delay and the block size based on the target bandwidth. For example, if a block size for a data transfer is fixed or otherwise set at 1 mebibyte (MiB), a target bandwidth for the data transfer is 68 MiB/second, and an estimated or expected transmission time for a 1 MiB block of data on the data network 115 is 2 milliseconds, the bandwidth module 206 may determine a delay of 12.7 milliseconds or the like to satisfy the target bandwidth, assuming the estimated or expected transmission time is accurate.

A delay and/or a block size for a data transfer, determined by the bandwidth module 206 or the like, may comprise a duty cycle for the data transfer (e.g., a ratio of time transferring the block of the block size to the total time including the delay). The bandwidth module 206 may set a duty cycle to satisfy a target bandwidth, to approach a target bandwidth, to move toward a target bandwidth, or the like. By determining a delay and/or a block size, setting a duty cycle, or the like for a data transfer, the bandwidth module 206 may thereby pulse-width modulate (PWM) transmission of the data transfer, with the block size or its transfer comprising the pulse-width (e.g., the pulse duration) and the combination of the delay and the transfer of the block of data comprising the period, the switching frequency, or the like.

Figure 3:
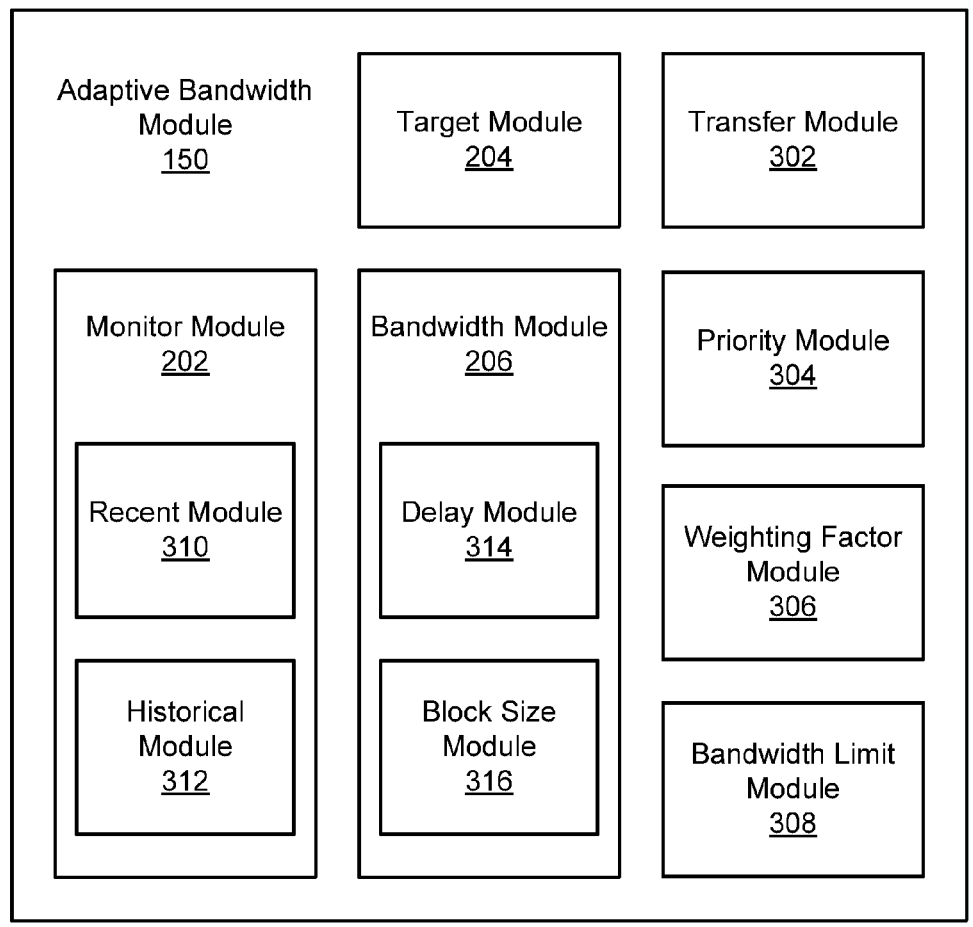
FIG. 3 is a schematic block diagram illustrating another embodiment of an adaptive bandwidth module.

FIG. 3 depicts another embodiment of an adaptive bandwidth module 150. The adaptive bandwidth module 150 may be substantially similar to the adaptive bandwidth module 150 described above with regard to FIGS. 1A, 1B, and 2. In the depicted embodiment, the adaptive bandwidth module 150 includes a monitor module 202, a target module 204, a bandwidth module 206, a transfer module 302, a priority module 304, a weighting factor module 306, and a bandwidth limit module 308. The monitor module 202, in the depicted embodiment, includes a recent module 310 and a historical module 312. The bandwidth module 206, in the depicted embodiment, includes a delay module 314 and a block size module 316.

In one embodiment, the transfer module 302 is configured to transfer blocks of data for one or more data transfers using a delay and/or a block size for a data transfer, determined by the bandwidth module 206 or the like. The transfer module 302 may transfer a block of data for a data transfer using the data network 115, by providing the block of data to a network driver, an operating system, a network stack (e.g., a transmission control protocol (TCP)/internet protocol (IP) stack), a host bus adapter (HBA) (e.g., a SCSI HBA, a fibre channel HBA, an eSATA HBA, an Ethernet HBA or NIC, or the like), a networking API, or otherwise sending, communicating, transferring, and/or transmitting the block of data from the source device 120 to the target device 116.

The transfer module 302, in certain embodiments, transfers a block of data for a data transfer using a delay. The transfer module 302 may temporarily wait, hold, sleep, delay, stop, and/or quiesce a data transfer for a delay time (e.g., a delay time from the bandwidth module 206) and may transfer, send, communicate, and/or transmit a block of data of the data transfer having a block size (e.g., a block size from the bandwidth module 206) in response to the delay time passing or transpiring. The transfer module 302 may transfer, send, communicate, and/or transmit a block of data of a data transfer having or using a block size, by including the block size in a network request (e.g., a starting address or offset and a length or size), by including the block of data directly in a network request as a payload, by including a reference or pointer to the block of data in a network request, or by otherwise providing the block of data and/or the block size to software and/or hardware of the data network 115 as described above.

By breaking a data transfer into discrete data blocks (e.g., having dynamic block sizes determined by the bandwidth module 206) and waiting or delaying between transfer of the data blocks (e.g., a delay time determined by the bandwidth module 206), in certain embodiments, the transfer module 302 may adaptively throttle or control an actual bandwidth for the data transfer based on target bandwidth (e.g., determined by the target module 204 based on one or more bandwidths monitored by the monitor module 202, based on a priority or quality of service level for the data transfer, or the like). In this manner, in one embodiment, a background data transfer, a lower priority data transfer, a data transfer with a lower quality of service level, or the like may have minimal, little, or no impact on one or more other, foreground data transfers, higher priority data transfers, data transfers with higher quality of service levels, or the like.

In one embodiment, the priority module 304 is configured to determine a priority or quality of service level for a data transfer. As described above, different data transfers may have different priorities or quality of service levels, for differentiated service or the like. The priority module 304, in certain embodiments, determines a priority or quality of service level for a data transfer based on a source of the data of the data transfer. For example, the priority module 304 may base a priority or quality of service level on a storage volume storing the data of the data transfer, on the source device 120 or the like.

As described above, a storage volume may comprise a logical or physical unit or container of data, such as a non-volatile memory device 120, a logical or physical partition or drive, a file system, an array of non-volatile memory devices 120, or the like and may be assigned or otherwise associated with a priority value, a quality of service level, or the like. The priority module 304 may assign or associate a data transfer with the priority value or quality of service level of a storage volume associated with the data transfer (e.g., a storage volume from which data of the data transfer is transferred, a storage volume to which data of the data transfer is being transferred, or the like). In a further embodiment, the priority module 304 may assign or associate a data transfer with a priority value or quality of service level of a process, job, or task executing the data transfer, or the like.

The priority module 304, in certain embodiments, may assign a user-selected priority level and/or quality of service level to a data transfer. For example, a user may select or define a priority value and/or a quality of service level for a data transfer directly; for data of a data transfer (e.g., a file, a range of logical addresses such as LBAs, or the like); for a storage volume; for a process, job, or task executing a data transfer; for a source device 120; for a target device 116; for a non-volatile memory device 120; or the like. In a further embodiment, the priority module 304 may retrieve or otherwise determine a priority value or quality of service level for a data transfer from a file (e.g., a configuration or settings file), from a packet header or other metadata for the data transfer, or the like.

As described above, a priority value and/or a quality of service level may comprise a label or indicator of a differentiated and/or tiered performance (e.g., bandwidth, throughput, delay, availability, error rate, or the like) for data; for a set of logical identifiers (e.g., a range of LBAs), for a storage volume; for a process, job, or task; for a data network 115; for a user or storage client 116; or the like. For example, in one embodiment, priorities or quality of service levels may include three different tiers, such as mission critical, business critical, and non-critical; low, medium, high; good, better, best; red, yellow, and green; or the like. In other embodiments, priorities or quality of service levels may include two different tiers, four different tiers, five different tiers, or more.

The priority module 304 may directly or indirectly associate a priority or quality of service level with data, with a data transfer, or the like. For example, the priority module 304 may assign a data transfer a priority or quality of service level directly or the priority module 304 may cause the data transfer to indirectly inherit or otherwise be associated with a priority or quality of service level for data of the data transfer, for a storage volume of the data of the data transfer, for an owner or user of the data, or the like. Similarly, the priority module 304 may directly assign data of a data transfer a priority or quality of service level (e.g., a QoS level for an LBA range, for a data file, or the like) or the priority module 304 may cause the data to indirectly inherit or otherwise be associated with a priority or quality of service level for a storage volume of the data, for an owner or user of the data, or the like.

In one embodiment, for a background data transfer or the like, the priority module 304 may lower a priority value or quality of service level a predefined amount. For example, in an embodiment where the priority module 304 determines a priority or quality of service level for a data transfer based on a priority or quality of service level of a storage volume associated with the data transfer, the priority module 304 may determine that the data transfer is a background data transfer, and may lower the priority or quality of service level of the storage volume by a predefined amount (e.g., one QoS level or the like) to determine the priority or quality of service level for the data transfer. In this manner, in certain embodiments, a background data transfer from a storage volume or other source will have a lower priority or quality of service level than a foreground or user data transfer from the same source. In further embodiments, the priority module 304 may otherwise adjust or determine a priority or quality of service level for a data transfer based on a type, class, or category of the data transfer.

In one embodiment, the weighting factor module 306 is configured to select or determine a weighting factor for a data transfer. As described above, a weighting factor may comprise a scalar, a coefficient, a variable, a constant, and/or another value usable by the target module 204 to determine a target bandwidth. The weighting factor module 306, in one embodiment, may select weighting factors so that target bandwidths for different priorities or quality of service levels are weighted or shifted to different time periods or windows of bandwidths monitored by the monitor module 202 (e.g., weighted toward a network bandwidth, weighted toward a recent bandwidth, weighted toward a historical bandwidth, or the like). In embodiments where the weighting factor module 306 determines different weighting factors for different data transfers, based on different priorities or quality of service levels or the like, the different weighting factors may cause different data transfers to have different sensitivities to different portions or periods of bandwidth (e.g., the weighting factor may comprise a sensitivity of the target bandwidth to the recent and/or network bandwidth, as described above).

As described above, a sensitivity of a target bandwidth to a monitored bandwidth or portion thereof may comprise a response of the target bandwidth to changes in the monitored bandwidth, an amount or portion of the monitored bandwidth on which the target bandwidth is based, or the like. The weighting factor module 306, in one embodiment, may select one or more weighting factors so that different target bandwidths may be weighted or shifted toward different monitored bandwidths (e.g., a network bandwidth, a recent bandwidth, a historical bandwidth) based on different priorities or quality of service levels. If the weighting factor module 306 determines a weighting factor, scalar, coefficient, or the like for a monitored bandwidth that is greater than a weighting factor, scalar, coefficient, or the like for one or more other bandwidths, the resulting target bandwidth may be weighted or shifted toward the monitored bandwidth.

The weighting factor module 306 may determine a weighting factor comprising a sensitivity of a target bandwidth to a monitored bandwidth, such as a sensitivity of a target bandwidth to a network bandwidth (e.g., a recent bandwidth), a sensitivity of a target bandwidth to a historical bandwidth, or the like. The weighting factor module 306, in certain embodiments, determines or selects weighting factors so that a sensitivity of a target bandwidth increases as a priority or quality of service level for a data transfer decreases. In other embodiments, the weighting factor module 306 may determine or select weighting factors so that a target bandwidth has one or more other sensitivities to a monitored bandwidth, based on priority or quality of service levels, or the like.

The weighting factor module 306, in certain embodiments, may select or determine a weighting factor so that an associated target bandwidth is based more on a historical bandwidth than a network bandwidth (e.g., a recent bandwidth) for higher values of priority or quality of service levels, is based more on a network bandwidth (e.g., a recent bandwidth) than a historical bandwidth for lower values of priority or quality of service levels, or the like. The target module 204, as described above, may determine one or more target bandwidths based on weighting factors determined by the weighting factor module 306.

In certain embodiments, the weighting factor module 306 may reference or lookup a weighting factor for a data transfer using a mapping (e.g., a lookup table or other data structure, a hard-coded mapping, or the like) mapping priority or quality of service levels to predefined weighting factors. For example, in one embodiment, the weighting factor module 306 may map or assign a high quality of service level to a weighting factor of 0.8, a medium quality of service level to a weighting factor of 0.5, and a low quality of service level to a weighting factor of 0.2, or the like.

In another embodiment, the weighting factor module 306 may dynamically and/or automatically determine weighting factors based on priorities and/or quality of service levels for one or more data transfers. For example, the weighting factor module 306 may analyze or process the different priorities or quality of service levels of different data transfers (e.g., previous data transfers, concurrent data transfers, or the like) and determine or assign weighting factors based on a distribution of the different priorities or quality of service levels.

In one embodiment, the bandwidth limit module 308 determines a bandwidth limit for a data transfer, for a set of data transfers, for a data network 115, for a source device 120, for a target device 116, or the like. The bandwidth limit module 308, in certain embodiments, receives a bandwidth limit, a selection of a bandwidth limit, or the like from a user. For example, a user may select a bandwidth limit during a configuration process, a setup process, an initialization process, using a configuration tool or utility, or the like. In a further embodiment, the bandwidth limit module 308 may lookup, reference, or retrieve a bandwidth limit from a configuration file, from software and/or hardware associated with the data network 115 (e.g., a network driver, an operating system, a network stack such as a TCP/IP stack, a SCSI HBA, a fibre channel HBA, an eSATA HBA, an Ethernet HBA or NIC, a networking API, a router, a switch, a hub, a network appliance, a storage appliance, or the like).

The bandwidth limit module 308 may provide a bandwidth limit to the target module 204 or otherwise cooperate with the target module 204 so that one or more target bandwidths determined by the target module 204 satisfy the bandwidth limit. A target bandwidth may satisfy a bandwidth limit if the target bandwidth is less than the bandwidth limit, less than or equal to the bandwidth limit, or has another predefined relationship to the bandwidth limit. In a further embodiment, the bandwidth limit module 308 determines a bandwidth limit for a plurality of concurrent data transfers and cooperates with the target module 204 to ensure that the plurality of concurrent data transfers satisfy the bandwidth limit. In response to determining that a target bandwidth does not satisfy a bandwidth limit, the target module 204 and/or the bandwidth limit module 308 may reduce or otherwise adjust the target bandwidth to satisfy the bandwidth limit (e.g., capping the target bandwidth at the bandwidth limit).

In one embodiment, the monitor module 202 uses the recent module 310 to determine a network bandwidth (e.g., a recent bandwidth) for a data transfer, for several concurrent data transfers, or the like. The monitor module 202, in a further embodiment, uses the historical module 312 to determine a historical bandwidth for a data transfer, for several concurrent data transfers, or the like. The historical module 312 may determine a historical bandwidth based on a transfer of a plurality of blocks of data of a data transfer. The recent module 310 may determine a network bandwidth (e.g., a recent bandwidth) based on a transfer of a most recently transferred block of data, a most recent set of transferred blocks of data, or the like of a data transfer.

As described above, a bandwidth may comprise a rate (e.g., a bit rate) or throughput for one or more data transfers. The recent module 310 and/or the historical module 312 may measure or represent a bandwidth as data transferred or copied over time, such as bits per second, kilobits or kibibits per second, megabits or mebibits per second, gigabits or gibibits per second, or the like. The recent module 310 and/or the historical module 312, in certain embodiments, may monitor bandwidths for individual data transfers from the source device 110. In a further embodiment, the recent module 310 and/or the historical module 312 may monitor a total or cumulative bandwidth for multiple data transfers from the source device 110, for a communications interface 113, or the like.

The recent module 310 and/or the historical module 312, in certain embodiments, may monitor and/or determine bandwidths for different resolutions or time periods. For example, the recent module 310 may monitor and/or determine a current and/or recent network bandwidth for a data transfer while the historical module 312 may monitor and/or determine a historical bandwidth for the data transfer, or the like. As described above, a network bandwidth, a recent bandwidth, or the like, which the recent module 310 may determine, may include or be based on a shorter and/or more recent period of time than a historical bandwidth, which the historical module 312 may determine. A historical bandwidth, as used herein, comprises a bandwidth or throughput of one or more data transfers over a time period or window of time. The time period or window of time for a historical bandwidth may include an entire data transfer, transfer of multiple blocks of a data transfer, or the like. A network bandwidth or recent bandwidth, as used herein, comprises a bandwidth or throughput of one or more data transfers over a shorter time period or window of time than an associated historical bandwidth (e.g., an instantaneous bandwidth, a bandwidth for transfer of a single block of a data transfer, a bandwidth for fewer blocks of a data transfer than a historical bandwidth, or the like).

For example, the recent module 310 may determine a network bandwidth, a recent bandwidth, or the like which may comprise a bandwidth or throughput of a transfer of one or more most recent blocks of data for one or more data transfers and the historical module 312 may determine a historical bandwidth or the like which may comprise a bandwidth or throughput of one or more entire in-progress data transfers, one or more data transfers up to a current point, a longer or larger portion of one or more data transfers than the network bandwidth, or the like. In certain embodiments, the recent module 310 and/or the historical module 312 may cooperate to define or track bandwidths by time periods, with a network bandwidth (e.g., a current and/or recent bandwidth) having a shorter time period than a historical bandwidth. For example, a time period or window for a network bandwidth (e.g., a current and/or recent bandwidth) may be five minutes and a time period or window for a historical bandwidth may be fifteen minutes, or the like. A time period or window for a historical bandwidth, for a network bandwidth, or the like, in certain embodiments, may comprise a sliding window with a constant period that moves over time (e.g., a five minute sliding window, a fifteen minute sliding window, or the like).

The recent module 310 and/or the historical module 312, in one embodiment, may monitor or determine a bandwidth directly. For example, the recent module 310 may start a timer when a block of data for a data transfer is transferred to time the transfer and may divide the block size of the block of data by the resulting time, by the resulting time plus a delay, or the like to determine a bandwidth. The recent module 310 may time just the transfer of data, may time a delay and the transfer of data, or the like. The historical module 312, in one embodiment, may determine a historical bandwidth based on a combination of network bandwidths (e.g., recent and/or current bandwidths) determined by the recent module 310 over multiple periods.

The historical module 312 may combine or average several blocks or time periods of network bandwidths (e.g., current and/or recent bandwidths) from the recent module 310 to determine a historical bandwidth, or may otherwise determine a historical bandwidth based on a network bandwidth. The historical module 312, in certain embodiments, may include a transfer of a plurality of blocks of data for a data transfer in a historical bandwidth and the recent module 310 may include a transfer of a most recently transferred block of data for the data transfer in a network bandwidth (e.g., a current and/or recent bandwidth).

The recent module 310 and/or the historical module 312 may monitor or determine bandwidths for multiple concurrent data transfers, from different storage volumes, with different priorities or quality of service levels, or the like. For example, as described above, the recent module 310 may start a different timer for each data transfer and may time transfers of blocks for each data transfer and determine a bandwidth based on sizes and/or delays for the blocks and on the transmission times from the timers. The recent module 310 and/or the historical module 312 may monitor, check, or otherwise determine a network bandwidth (e.g., a current and/or recent bandwidth), a historical bandwidth, or the like for each of a plurality of concurrent data transfers, with different priorities or quality of service levels, or the like. By monitoring a bandwidth for each of a plurality of data transfers, in certain embodiments, the recent module 310 and/or the historical module 312 allow the adaptive bandwidth module 150 to determine different target bandwidths for the different data transfers, based on different windows or time periods, based on different priorities or qualities of service, or the like.

In one embodiment, the bandwidth module 206 uses the delay module 314 to determine a delay for a block of data of a data transfer. The bandwidth module 206, in a further embodiment, uses the block size module 316 to determine a block size for a block of data of a data transfer.

The delay module 314, the block size module 316, or the like, in certain embodiments, determine a delay and/or a block size for a block of data if a data transfer based on or to satisfy a target bandwidth. For example, the delay module 314 and/or the block size module 316 may determine a delay, a block size, or the like so that the block size divided by the result of the delay plus an estimated duration of transferring the block of data is less than or equal to the target bandwidth, or the like, as described above.

In one embodiment, the delay module 314 is configured to adjust a delay for transferring a block of data of a data transfer based on a target bandwidth from the target module 204 (e.g., to satisfy the target bandwidth, to approach the target bandwidth, to move toward the target bandwidth, or the like). As described above, a delay for a data transfer may comprise a waiting period, hold period, or the like between transfers of different blocks of data for the data transfer, during which little or no data of the data transfer is transferred. For example, the transfer module 302 described above may transfer a first block of data for a data transfer, wait a delay period determined by the delay module 314, and transfer a second block of data for the data transfer. The delay module 314 may measure and/or determine a delay in terms of minutes, seconds, milliseconds, microseconds, nanoseconds, processor cycles, or the like. The delay module 314 may provide a determined delay to the transfer module 302, or the like.

In one embodiment, the delay module 314 may determine a dynamic adjusted or updated delay time but use a constant and/or predefined block size from the block size module 316. In a further embodiment, the block size module 316 may determine a dynamic adjusted or updated block size but use a constant and/or predefined delay time from the delay module 314. In certain embodiments, the delay module 314 may determine an adjusted or updated delay time and the block size module 316 may determine an adjusted or updated block size, both for a block of data of the same data transfer.

The delay module 314 and/or the block size module 316, in one embodiment, may adjust, update, and/or otherwise determine one or more of a delay and a block size for a data transfer so that a bandwidth for the data transfer to approach or move toward a target bandwidth, based on a target bandwidth, or the like. The delay module 314 and/or the block size module 316 may cooperate, in certain embodiments, so that a determined block size divided by the result of the determined delay plus an estimated duration of transferring the associated block of data is less than or equal to the target bandwidth.

In one embodiment, the block size module 316 is configured to adjust a block size for transferring one or more blocks of data of a data transfer based on a target bandwidth from the target module 204 (e.g., to satisfy the target bandwidth, to approach the target bandwidth, to move toward the target bandwidth, or the like). As described above, a block of data for a data transfer may comprise a chunk, an amount, and/or a portion of data of a data transfer that is transferred contiguously, sequentially, without interruption, between delays, or the like, at least from the perspective of the source device 110 and a block size may comprise a data size of the block of data. The block size module 316, in certain embodiments, may dynamically adjust, change, and/or update a block size for a block of data of a data transfer. The transfer module 302, described above, may transfer a first block of data having a block size determined by the block size module 316, wait a delay period determined by the delay module 314, and transfer a second block of data having a different block size determined by the block size module 316, both for the same data transfer. The block size module 316, in certain embodiments, may provide a block size to the transfer module 302, described above.

In one embodiment, the delay module 314 and/or the block size module 316 may determine a delay time and/or a block size based on one or more rules, as described above with regard to the bandwidth module 206. For example, the delay module 314 and/or the block size module 316 may use a rule defining an initial block size, an initial delay, or the like. The block size module 316, in certain embodiments, may set an initial block size for a data transfer to a predetermined initial block size. In a further embodiment, the delay module 314 may set an initial delay for a data block of a data transfer to a predetermined initial delay time. In one embodiment, the delay module 314 may set an initial delay to zero, so that there is no added, artificial delay for transmission of an initial data block of a data transfer. In another embodiment, the block size module 316 may determine an initial block size and/or delay for an initial block of data of a data transfer, based on a previous data transfer, a most recent data transfer, a most recently transferred block of data for a different data transfer, or the like.

In one embodiment, the block size module 316 uses a rule decreasing a block size for a data transfer (e.g., for a subsequent block of data) in response to determining that a delay for the data transfer was greater than a duration of transferring a block of data for the data transfer at a previous block size (e.g., transferring a previous block of data). In a further embodiment, the block size module 316 uses a rule defining a minimum block size, such as 4 KiB or the like, and may not reduce the block size below the minimum block size.

The delay module 314, in one embodiment, in response to the block size module 316 determining a block size, may determine, adjust, and/or update the associated delay based on the determined block size, an estimated or expected transmission time or throughput, and/or a target bandwidth. In another embodiment, the block size module 316, in response to the delay module 314 determining a delay, may determine, adjust, and/or update the associated block size based on the determined delay, an estimated or expected transmission time or throughput, and/or a target bandwidth.

Figure 4A:
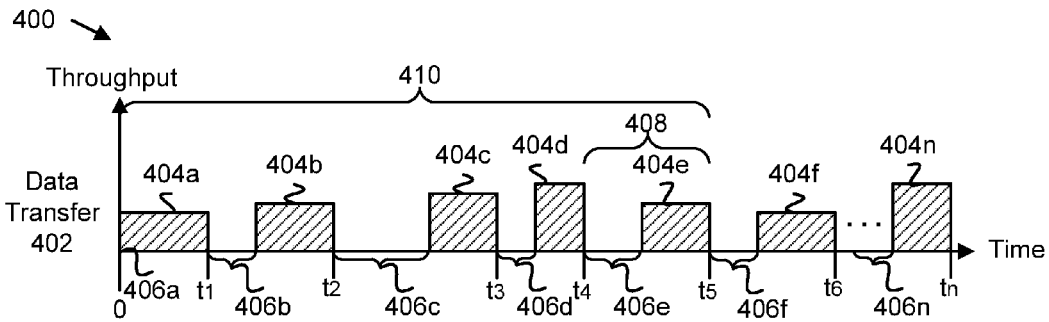
FIG. 4A is a schematic block diagram illustrating one embodiment of an adaptively throttled data transfer.

FIG. 4A depicts a chart 400 illustrating one embodiment of an adaptively throttled data transfer 402. In the depicted embodiment, the adaptive bandwidth module 150 dynamically adjusts or throttles a bandwidth consumed by the data transfer 402, based on a priority or quality of service level for the data transfer 402 and based on one or more monitored bandwidths 408, 410 for the data transfer 402.

For example, at time t5 or the like, the monitor module 202 and/or the recent module 310, may monitor or determine a network bandwidth 408 (e.g., a recent bandwidth 408) for the data transfer 402. The network bandwidth 408, in the depicted embodiment, comprises a bandwidth used during a single period including a most recent delay 406e and transmission or transfer of a most recent data block 404e (e.g., at time t5). In other embodiments, a network bandwidth 408 and/or a recent bandwidth 408 may include multiple most recent periods (e.g., t2-t5, t3-t5, t4-t5, or the like).

At time t5, in the depicted embodiment, a historical bandwidth 410 comprises a bandwidth used during the entire data transfer 402 up to time t5 (e.g., 5 periods t1-t5). In certain embodiments, the historical bandwidth 410 may be based on an entire data transfer 402 up to a current time. In a further embodiment, the monitor module 202 and/or the historical module 312 may use a sliding window, a moving window, or the like to determine a historical bandwidth 410, comprising a bandwidth used during a predefined number of periods of the data transfer 402, or the like. For example, if a sliding or moving window for the historical bandwidth 410 comprises 5 periods, at time t6, the monitor module 202 and/or the historical module 312 may remove the bandwidth for period t1 from the historical bandwidth 410 and add the bandwidth for period t6 to the historical bandwidth 410, and so on until time tn, when the data transfer 402 is complete.

In certain embodiments, at the end of each transmission period, at times t1-tn, the target module 204 determines a target bandwidth for the data transfer 402, based on the network bandwidth 408 (e.g., recent bandwidth 408), the historical bandwidth 410, a priority or quality of service level for the data transfer 402, or the like. For example, the target module 204 may use Equation 1, Equation 2, or another equation, model, and/or rule as described above.

The bandwidth module 206, using the delay module 314 and/or the block size module 316, in certain embodiments, determines a delay 406a-n, a block size 404a-n, or both for the data transfer 402 based on the target bandwidths determined by the target module 204. For example, at times t1-tn or the like, the delay module 314 and/or the block size module 316 may update or adjust a size of a delay 406a-n and/or a block size 404l-n to satisfy an updated target bandwidth, based on one or more rules, or the like. At time t3, in the depicted embodiment, the block size module 316 may determine that the previous delay 406c was longer than a duration of transferring the block 404c of data, and the block size module 316 may reduce the block size for a subsequent block 404d of data of the data transfer 402. The delay module 314 may adjust a subsequent delay 406d so that the reduced block size 404d and the subsequent delay 406d satisfy, approach, and/or estimate a target bandwidth.

In certain embodiments, by breaking up the data transfer 402 into multiple blocks 404a-n of data and pulse width modulating the data transfer 402 with delays 406a-n, the adaptive bandwidth module 150 may adaptively throttle or control the data transfer 402, to minimize an impact of the data transfer 402 on the data network 115 or the like. For example, in one embodiment, at a time t1-tn during which the data network 115 is busy or congested (e.g., a bandwidth 408, 410 monitored by the monitor module 202 is lower), the target module 204 may reduce a target bandwidth for the data transfer 402, causing the bandwidth module 206 to increase a delay 406a-n, decrease a block size 404a-n, or both. In response to a bandwidth 408, 410 increasing, as the data network 115 becomes less busy or congested, the target module 204 may increase the target bandwidth, causing the bandwidth module 206 to decrease a delay 406a-n, increase a block size 404a-n, or both.

Figure 4B:
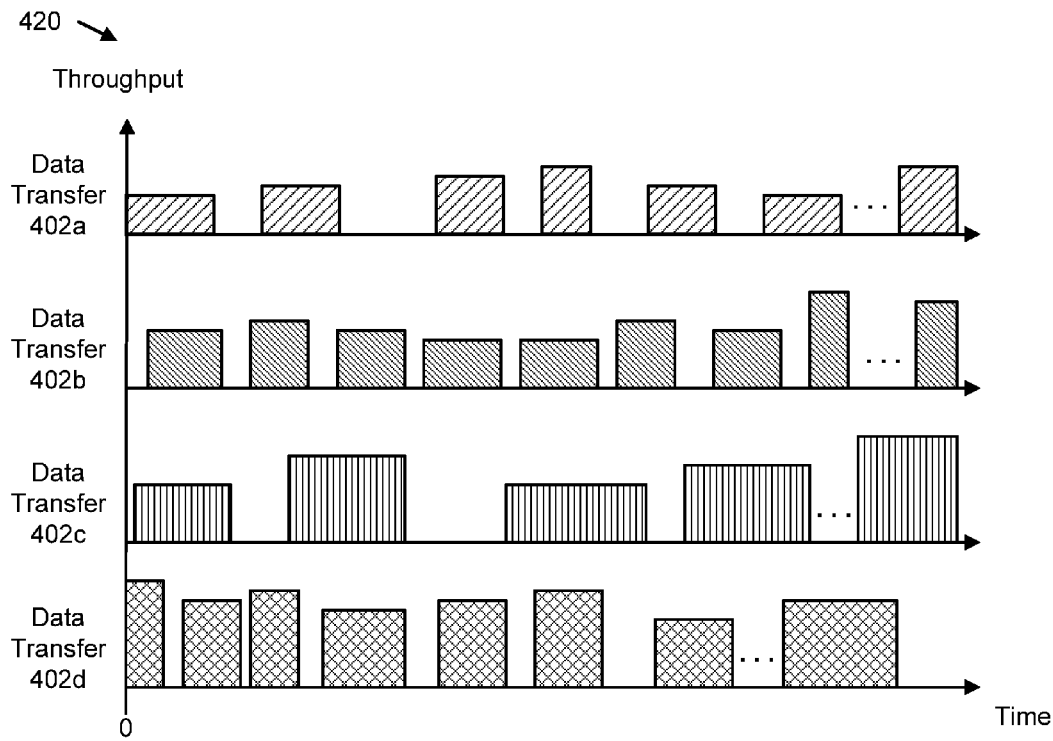
FIG. 4B is a schematic block diagram illustrating one embodiment of adaptively throttled data transfers.

FIG. 4B depicts a chart 420 illustrating one embodiment of a plurality of adaptively throttled concurrent data transfers 402a-d with different priorities or quality of service levels. The adaptive bandwidth module 150 (e.g., the monitor module 202, the target module 204, the bandwidth module 206, the transfer module 302, the priority module 304, the weighting factor module 306, the bandwidth limit module 308, the recent module 310, the historical module 312, the delay module 314, and/or the block size module 316) may manage each data transfer 402a-d substantially as described above with regard to the data transfer 402 of FIG. 4A.

Different data transfers 402a-d in FIG. 4B, in certain embodiments, may have different priority or quality of service levels. By weighting or shifting the different data transfers 402a-d more toward a historical bandwidth 410 for higher priority data transfers 402a-d, more toward a network bandwidth 408 (e.g., a recent bandwidth 408) for lower priority data transfers 402a-d, or the like, the adaptive bandwidth module 150 may provide the higher priority data transfers 402a-d with a more consistent bandwidth than the lower priority data transfers 402a-d. The monitor module 202, in various embodiments, may monitor or determine one or more bandwidths 408, 410 individually and/or separately for each data transfer 402a-d, may determine one or more global bandwidths 408, 410 for the data network 115, or the like. The target module 204 may determine different target bandwidths for the different data transfers 402a-d and the bandwidth module 206 may determine different delays and/or block sizes based on the different target bandwidths, to provide individualized bandwidth throttling based on priority or quality of service levels.

Figure 5:
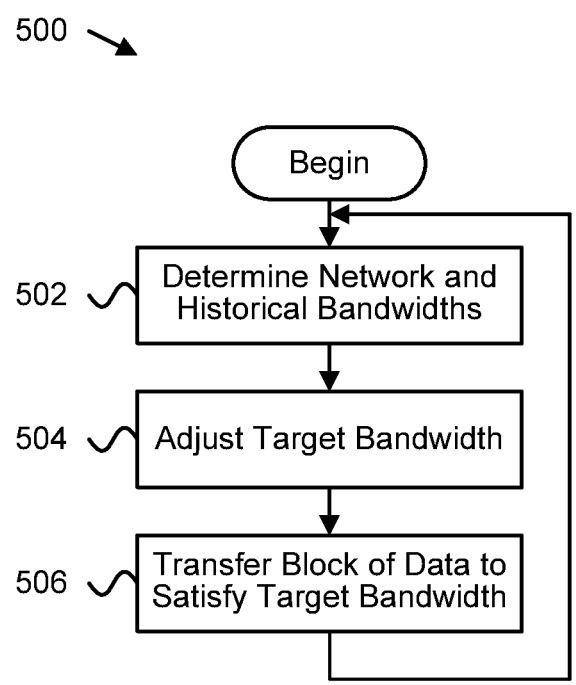
FIG. 5 is a schematic flow chart diagram illustrating one embodiment of a method for adaptive bandwidth throttling.

FIG. 5 depicts one embodiment of a method 500 for adaptive bandwidth throttling. The method 500 begins and the monitor module 202 determines 502 a network bandwidth and/or a historical bandwidth for a data transfer of data between a source device 120 and a target device 116. The target module 204 adjusts 504 a target bandwidth for the data transfer based on the determined 502 network bandwidth and/or historical bandwidth. A weighting factor for the target bandwidth, in certain embodiments, may be based on a priority or quality of service for the data transfer. The transfer module 302 transfers 506 at least a block of data of the data transfer from the source device to the target device. The bandwidth module 206 may select one or more of a delay before the transfer module 302 transfers 506 the block and a block size for the block based on the adjusted 504 target bandwidth. The method 500 may continue until the data transfer is complete, for subsequent data transfers, or the like.

Figure 6:
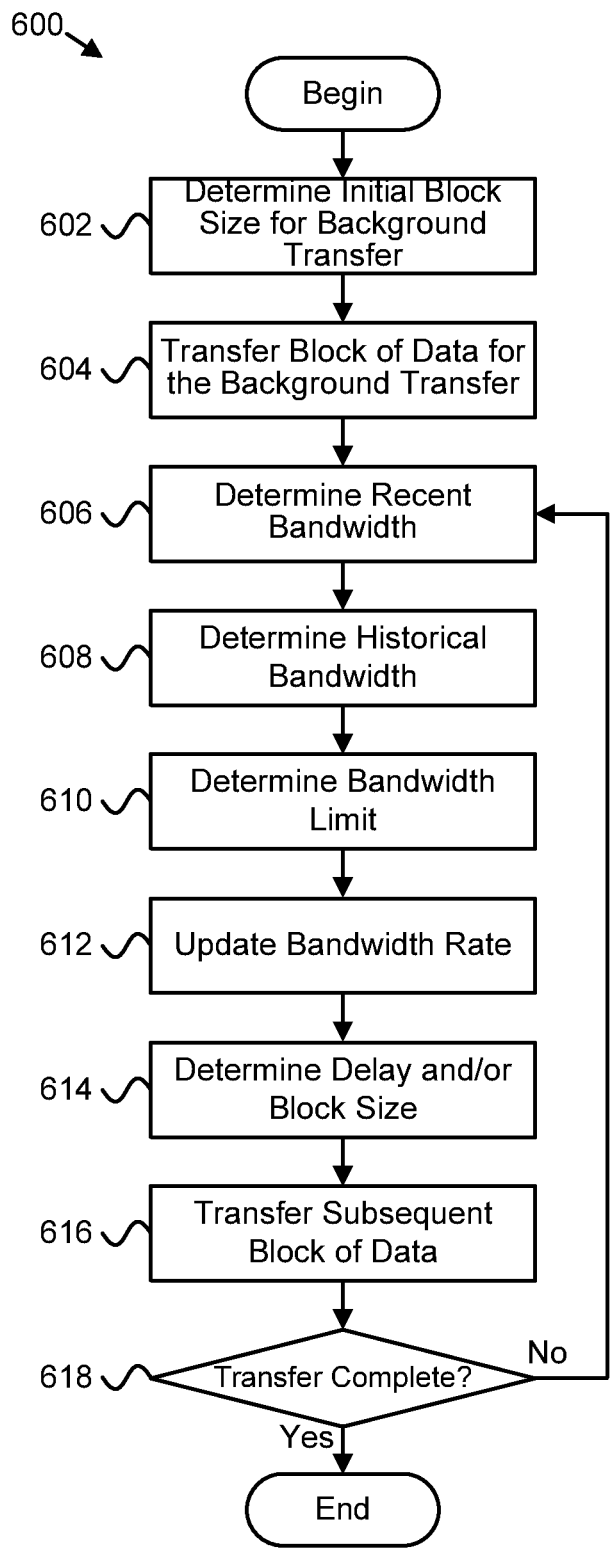
FIG. 6 is a schematic flow chart diagram illustrating a further embodiment of a method for adaptive bandwidth throttling.

FIG. 6 depicts a further embodiment of a method 600 for adaptive bandwidth throttling. The method 600 begins and the block size module 316 determines 602 an initial block size for a background transfer between a source device 120 and a target device 116. The transfer module 302 transfers 604 a block of data for the background transfer between the source device 120 and the target device 116 at the determined 602 block size.

The recent module 310 determines 606 a network bandwidth (e.g., a recent bandwidth) for the transfer of the block of data. The historical module 312 determines 608 a historical bandwidth for a transfer of a plurality of blocks of data. The bandwidth limit module 308 determines 610 a bandwidth limit between the source device 120 and the target device 116. The target module 204 updates 612 a target bandwidth or other bandwidth rate for transfer of a subsequent block of data for the background transfer based on at least one of the recent bandwidth and the historical bandwidth. The target module 204 may base a weighting factor for the bandwidth rate on a priority (e.g., a quality of service) for the background transfer. The bandwidth module 206 determines 614 a delay (e.g., using the delay module 314) and/or an updated block size (e.g., using the block size module 316) for the subsequent block of data for the background transfer to satisfy the updated 612 target bandwidth or other bandwidth rate, to satisfy the bandwidth limit, or the like.

The transfer module 302 transfers 616 the subsequent block of data using the determined 614 delay and/or updated block size. The transfer module 302 determines 618 whether or not the background transfer is complete. If the transfer is complete 618, the method 600 ends. If the transfer is not complete 618, the method 600 continues and the recent module 310 re-determines 606 a network bandwidth (e.g., a recent bandwidth), the historical module 312 re-determines 608 a historical bandwidth, and the like until the background transfer completes 618 and the method 600 ends.

A means for tracking a historical bandwidth 410 and/or a recent bandwidth 408 for a data transfer 402, in various embodiments, may include a monitor module 202, a recent module 310, a historical module 312, an adaptive bandwidth module 150, a source device 120, a non-volatile memory controller 124, a non-volatile memory media controller 126, an SML 130, other logic hardware, and/or other executable code stored on a computer readable storage medium. Other embodiments may include similar or equivalent means for tracking at least a historical bandwidth 410 and a recent bandwidth 408 for a data transfer 402.

A means for adjusting a delay 406a-n and a block size 404a-n for a data transfer 402 based on a historical bandwidth 410, a recent bandwidth 408, and/or a priority or quality of service level for the data transfer 402, in various embodiments, may include a bandwidth module 206, a delay module 314, a block size module 316, an adaptive bandwidth module 150, a source device 120, a non-volatile memory controller 124, a non-volatile memory media controller 126, an SML 130, other logic hardware, and/or other executable code stored on a computer readable storage medium. Other embodiments may include similar or equivalent means for adjusting a delay 406a-n and a block size 404a-n for a data transfer 402 based on a historical bandwidth 410, a recent bandwidth 408, and/or a priority or quality of service level for the data transfer 402.

A means for transferring one or more blocks 404a-n of a data transfer 402 with an adjusted delay 406a-n and/or block size 404a-n, in various embodiments, may include a transfer module 302, an adaptive bandwidth module 150, a host device 120, an HBA, a NIC, a network protocol stack, a network driver, a networking API, a router, a switch, a hub, a non-volatile memory controller 124, a non-volatile memory media controller 126, an SML 130, a data network 115, other logic hardware, and/or other executable code stored on a computer readable storage medium. Other embodiments may include similar or equivalent means for transferring one or more blocks 404a-n of a data transfer 402 with an adjusted delay 406a-n and/or block size 404a-n.

A means for determining a target bandwidth for a data transfer 402 based on a combination of a historical bandwidth 410 and a recent bandwidth 408 weighted based on a priority or quality of service level for the data transfer 402, in various embodiments, may include a target module 204, an adaptive bandwidth module 150, a source device 120, a non-volatile memory controller 124, a non-volatile memory media controller 126, an SML 130, other logic hardware, and/or other executable code stored on a computer readable storage medium. Other embodiments may include similar or equivalent means for determining a target bandwidth for a data transfer 402 based on a combination of a historical bandwidth 410 and a recent bandwidth 408 weighted based on a priority or quality of service level for the data transfer 402.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   determining one or more of a network bandwidth and a historical bandwidth for a data transfer between a storage source adapted to store computer data and a storage target adapted to store computer data;
   adjusting a target bandwidth for the data transfer using a weighting factor, the target bandwidth based on at least one of the network bandwidth and the historical bandwidth, the weighting factor based on a priority for the data transfer; and
   transferring at least a block of data of the data transfer from the storage source to the storage target in a manner configured to satisfy the target bandwidth, wherein one or more of a delay before transferring the block and a block size for the block is selected based on the target bandwidth;
   wherein the weighting factor is selected such that the target bandwidth is based more on the historical bandwidth than the network bandwidth for a higher value for the priority and is based more on the network bandwidth than the historical bandwidth for a lower value for the priority.

2. The method of claim 1, wherein the target bandwidth comprises the network bandwidth multiplied by the weighting factor plus the result of the historical bandwidth multiplied by one minus the weighting factor, the weighting factor being higher for the lower value for the priority than for the higher value for the priority.

3. The method of claim 1, wherein the target bandwidth comprises the historical bandwidth multiplied by the weighting factor plus the result of the network bandwidth multiplied by one minus the weighting factor, the weighting factor being higher for the higher value for the priority than for the lower value for the priority.

4. The method of claim 1, wherein the weighting factor is selected such that a sensitivity of the target bandwidth to the network bandwidth increases as the priority decreases.

5. The method of claim 1, wherein the priority for the data transfer is based on a quality of service level for a storage volume storing the data of the data transfer on the storage source.

6. The method of claim 5, wherein the data transfer comprises a background data transfer and the priority for the data transfer is a predefined amount lower than the quality of service level for the storage volume.

7. A method comprising:
   determining one or more of a network bandwidth and a historical bandwidth for a data transfer between a storage source adapted to store computer data and a storage target adapted to store computer data;
   adjusting a target bandwidth for the data transfer using a weighting factor, the target bandwidth based on at least one of the network bandwidth and the historical bandwidth, the weighting factor based on a priority for the data transfer;
   transferring at least a block of data of the data transfer from the storage source to the storage target in a manner configured to satisfy the target bandwidth, wherein one or more of a delay before transferring the block and a block size for the block is selected based on the target bandwidth; and
   decreasing the block size for transfer of a subsequent block of data of the data transfer in response to determining that the delay was greater than a duration of the transferring of the block of data.

8. A method comprising:
- determining one or more of a network bandwidth and a historical bandwidth for a data transfer between a storage source adapted to store computer data and a storage target adapted to store computer data;
- adjusting a target bandwidth for the data transfer using a weighting factor, the target bandwidth based on at least one of the network bandwidth and the historical bandwidth, the weighting factor based on a priority for the data transfer;
- transferring at least a block of data of the data transfer from the storage source to the storage target in a manner configured to satisfy the target bandwidth, wherein one or more of a delay before transferring the block and a block size for the block is selected based on the target bandwidth; and
- determining one or more of the delay and the block size for the block of data to satisfy the target bandwidth such that the block size divided by the result of the delay plus an estimated duration of the transferring of the block of data is less than or equal to the target bandwidth.

9. The method of claim 8, wherein the delay and the block size comprise a duty cycle for the data transfer, the duty cycle satisfying the target bandwidth.

10. The method of claim 8, further comprising:
- tracking a bandwidth used for transferring the block of data from the storage source to the storage target; and
- re-adjusting the target bandwidth for transfer of a subsequent block of data of the data transfer based at least partially on the tracked bandwidth.

11. The method of claim 8, further comprising determining a bandwidth limit between the storage source and the storage target, the adjusting of the target bandwidth satisfying the determined bandwidth limit.

12. The method of claim 8, wherein the data transfer of data comprises one or more of an asynchronous replication process and a deduplication process.

13. A method comprising:
- determining one or more of a network bandwidth and a historical bandwidth for a data transfer between a storage source adapted to store computer data and a storage target adapted to store computer data;
- adjusting a target bandwidth for the data transfer using a weighting factor, the target bandwidth based on at least one of the network bandwidth and the historical bandwidth, the weighting factor based on a priority for the data transfer; and
- transferring at least a block of data of the data transfer from the storage source to the storage target in a manner configured to satisfy the target bandwidth, wherein one or more of a delay before transferring the block and a block size for the block is selected based on the target bandwidth;
- wherein the historical bandwidth is for a transfer of a plurality of blocks of data for the data transfer and the network bandwidth is for a transfer of a most recently transferred block of data for the data transfer.

14. An apparatus comprising:
- a monitor module configured to monitor network bandwidth, the network bandwidth derived from the monitoring of the operation of a computer network adapted to transfer computer data between at least two separate locations, used for a plurality of data transfers between different storage volumes, the storage volumes associated with different quality of service levels;
- a target module configured to determine target bandwidths for the data transfers based on the monitored network bandwidth and the different quality of service levels of the storage volumes; and
- a bandwidth module configured to determine one or more of a waiting period between transfers of different blocks and a block size for each of the data transfers based on the target bandwidths;
- wherein the bandwidth module is configured to decrease a block size for a data transfer of the plurality of data transfers in response to determining that a waiting period for the data transfer was greater than a duration of transferring a segment of data for the data transfer at the block size.

15. The apparatus of claim 14, wherein the target module is configured to dynamically update the target bandwidths and the bandwidth module is configured to dynamically update the one or more of a waiting period between transfers of different blocks and a block size in response to a change in the monitored network bandwidth.

16. The apparatus of claim 14, wherein the target module is configured to determine the target bandwidths using different weighting factors for different quality of service levels such that the target bandwidths for data transfers with different quality of service levels are weighted to different time periods of the monitored network bandwidth.

17. An apparatus comprising:
- means for tracking at least a historical bandwidth and a recent bandwidth for a data transfer;
- means for adjusting a delay and a block size for the data transfer based on the historical bandwidth, the recent bandwidth, and a priority for the data transfer; and
- means for transferring one or more segments of the data transfer with the adjusted delay and block size for the one or more segments of the data transfer.

18. The apparatus of claim 17, further comprising means for determining a target bandwidth for the data transfer based on a combination of the historical bandwidth and the recent bandwidth weighted based on the priority for the data transfer, the delay and the block size adjusted based on the determined target bandwidth.

19. A method comprising:
- transferring data from a first storage volume associated with a computer data storage device using a target bandwidth, the target bandwidth based on a quality-of-service level for the first storage volume;
- transferring data from a second storage volume associated with a computer data storage device using a different target bandwidth, the different target bandwidth based on a different quality-of-service level for the second storage volume; and
- determining the different target bandwidth using a weighting factor selected based on the different quality-of-service level for the second storage volume;
- wherein the weighting factor is selected such that the different target bandwidth is influenced more by a historical bandwidth than by a network bandwidth for a first quality-of-service level for the second storage volume and is influenced more by the network bandwidth than by the historical bandwidth for a second quality-of-service level for the second storage volume.

20. The method of claim 19, wherein transferring the data from the first storage volume comprises a background data transfer for the first storage volume.

21. The method of claim 20, wherein the background data transfer comprises an asynchronous replication process for the first storage volume.

* * * * *